INVENTORS
GEORGE F. MOORE
THOMAS BEER

Dec. 6, 1960  G. F. MOORE ET AL  2,963,359
PROCESS OF MANUFACTURING DI-AMMONIUM PHOSPHATE
Filed Oct. 23, 1957  2 Sheets-Sheet 2

INVENTORS
GEORGE F. MOORE
THOMAS BEER

United States Patent Office 2,963,359
Patented Dec. 6, 1960

2,963,359

PROCESS OF MANUFACTURING DI-AMMONIUM PHOSPHATE

George F. Moore and Thomas Beer, Tampa, Fla., assignors to Tennessee Corporation, New York, N.Y., a corporation of New York Filed Oct. 23, 1957, Ser. No. 691,961

8 Claims. (Cl. 71—41)

The present invention relates to an improved process of manufacturing di-ammonium phosphate, and, more particularly, to an improved process of manufacturing approximate 18–47–0 ($N-P_2O_5$) grade of di-ammonium phosphate using phosphoric acid made by the wet method.

It has now been discovered that di-ammonium phosphate, particularly approximate 18–47–0 ($N-P_2O_5$) grade, can be manufactured by using a rotating mass of di-ammonium phosphate which constitutes a bed in which liquid phosphoric acid can be neutralized by anhydrous ammonia.

It is an object of the present invention to provide an improved process of manufacturing di-ammonium phosphate in a relatively simple and economical manner.

Another object of the invention is to provide an improved process of manufacturing approximate 18–47–0 ($N-P_2O_5$) grade of di-ammonium phosphate involving wet operations and free from complicated equipment and difficult operations including the filtration of iron and aluminum phosphates.

The invention also contemplates providing an improved process of manufacturing di-ammonium phosphate in a rotating mass constituting a bed in which phosphoric acid can be neutralized by anhydrous ammonia.

It is a further object of the invention to provide an improved process of manufacturing approximate 18–47–0 ($N-P_2O_5$) grade of di-ammonium phosphate in a rotating bed onto which liquid phosphoric acid is sprayed and into which anhydrous ammonia is diffused.

The invention further contemplates providing an improved process of manufacturing di-ammonium phosphate in a rotating bed of particles thereof providing sufficient carrier and supply surface for liquid phosphoric acid to react with anhydrous ammonia and furnishing the proper nuclei for granulation.

Figure 1:
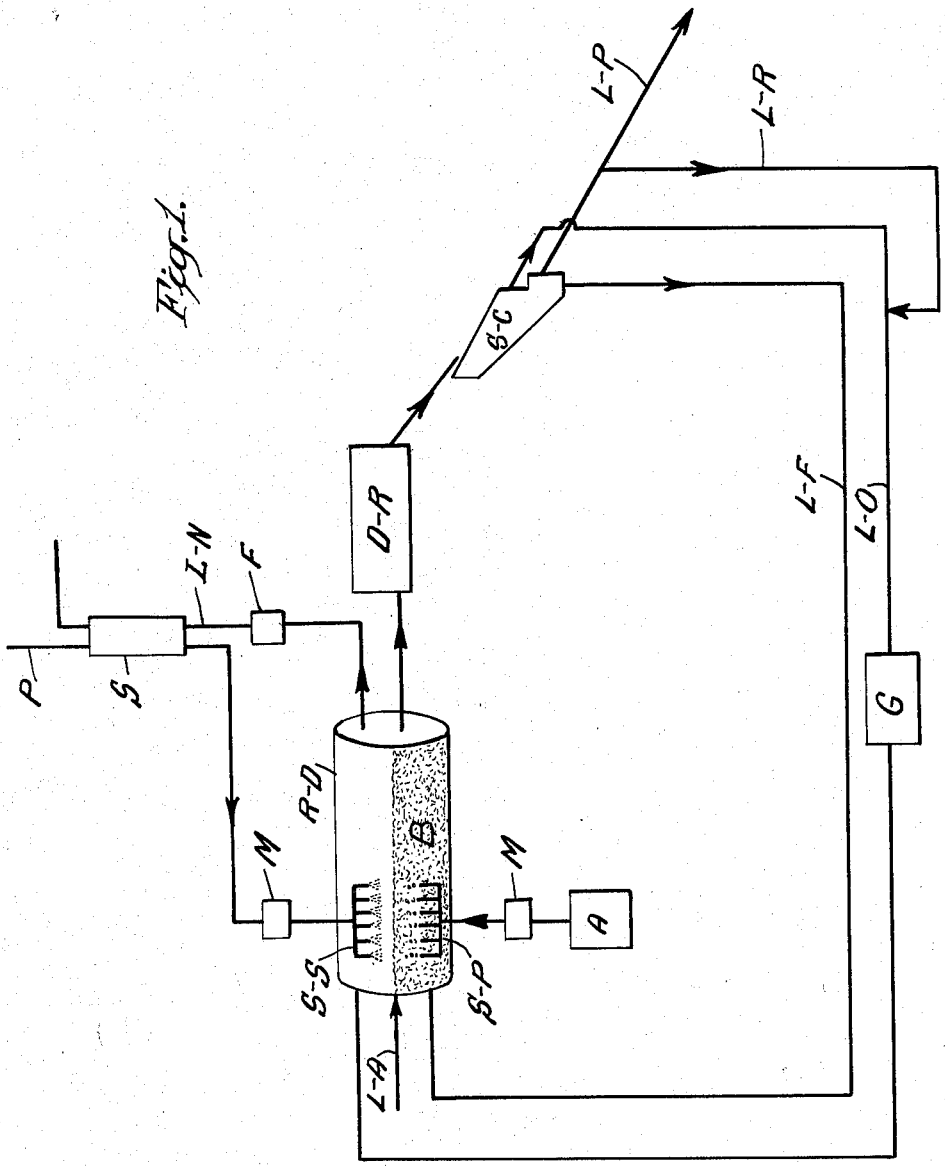
Figure 2:
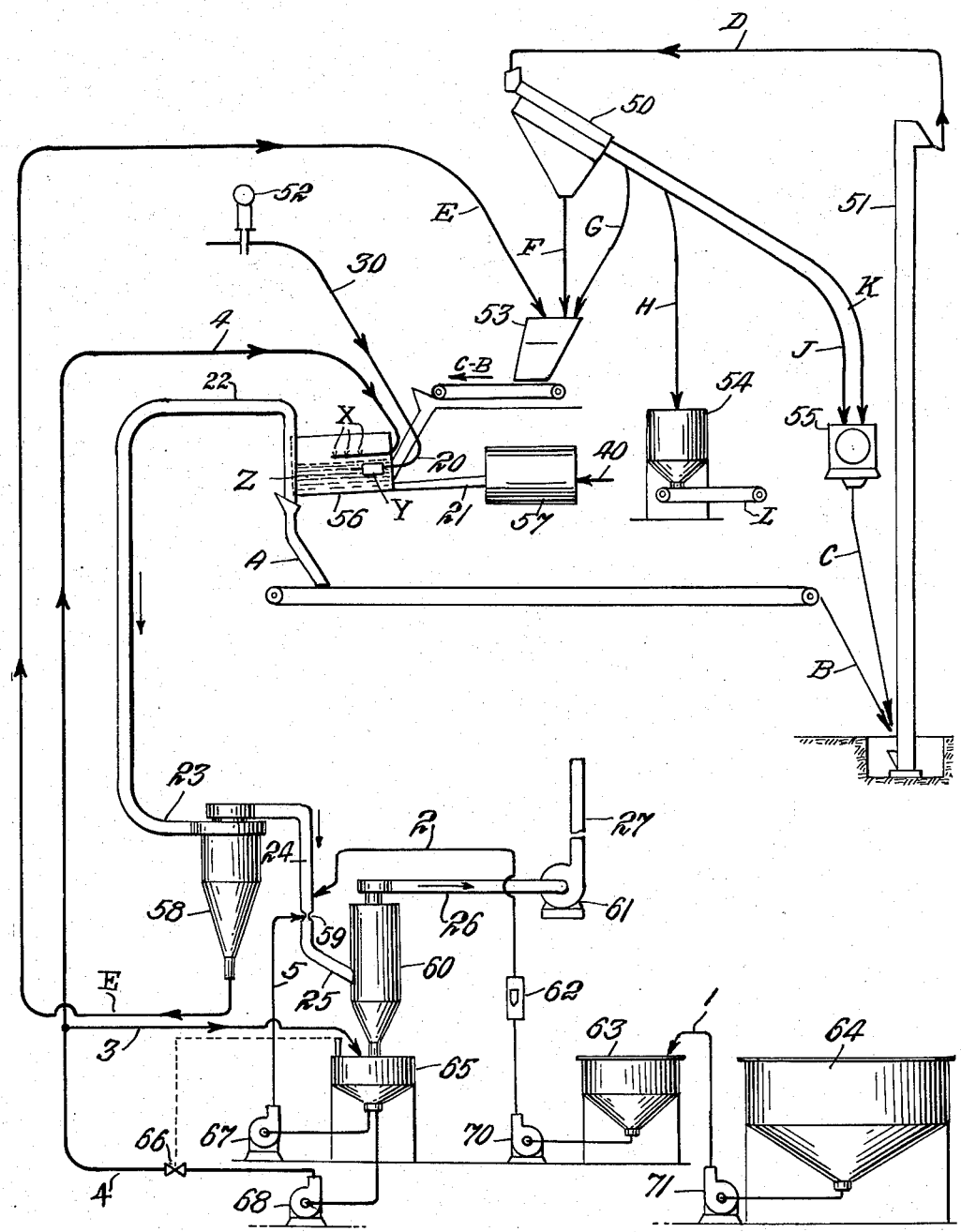

Other objects and advantages will become apparent from the following description taken in conjunction with the accompanying drawing, in which:

Fig. 1 is a schematic view of an arrangement of equipment capable of carrying the invention into practice; and Fig. 2 is similar to Fig. 1 except it illustrates a modified arrangement of equipment.

Generally speaking, the present invention contemplates the provision of a bed of di-ammonium phosphate 18–47–0 ($N-P_2O_5$) having a sufficient thickness and ground to an appropriate fineness to furnish sufficient carrier and supply surface for the liquid phosphoric acid and to furnish the proper nuclei for granulation. As a general practice, the bed, for instance, in a rotating drum, should preferably have a depth of less than about twelve inches. However, the size of the drum might influence the depth to a certain extent. With the aforesaid bed, liquid phosphoric acid can be sprayed over the mass of particles of di-ammonium phosphate to cover the surfaces thereof and anhydrous ammonia can be introduced at the bottom of the bed whereby neutralization of phosphoric acid with ammonia occurs within the bed and loss of ammonia is prevented. Of course, the phosphoric acid can be introduced by means of a distributor under pressure directly into the bed but spraying is preferred.

When other types of equipment are used, other depths are employed. For example, when a blunger is used, a depth of about 24 inches to about 36 inches would be appropriate. The depth should be substantial and sufficient to permit the vaporized ammonia to react with the phosphoric acid to produce di-ammonium phosphate.

In carrying the invention into practice, it is preferred to use, for example, a rotating drum of such type as conventionally used for mixing and granulating complete fertilizers. It is to be understood, however, that other types of equipment can be used, such as a blunger. A bed of di-ammonium phosphate of say, for instance, about 1,500 pounds is provided in the bottom of the rotating drum. Satisfactory results have been obtained with a bed having a depth of about seven inches to about twelve inches. The particles of phosphate constituting the bed are properly sized or ground to suitable fineness to furnish sufficient carrier and supply surface area for the liquid phosphoric acid and to furnish proper nuclei for granulation. Generally stated, the mass of di-ammonium phosphate should be composed of the following sizes.

| Size: | Percentage |
|---|---|
| —10 to +14 mesh | 5–15 |
| —14 to +32 mesh | 20–40 |
| —32 to +60 mesh | 20–40 |
| —60 mesh | 10–50 |

The foregoing sizes are based on U.S. Standard Sieves. Data obtained from tests have demonstrated that with recycle material containing about 2% of moisture, to the bulk of recycled material should be small granules having a size of about —14 mesh to +20 mesh. Generally speaking, there should be a minimum of fines and coarses.

While the drum is rotated, liquid phosphoric acid is sprayed on top of the bed at a rate of say, for instance, about 560 pounds of (42% $P_2O_5$) variety per minute and anhydrous liquid ammonia is introduced at the bottom of the bed at a rate of say, for instance, about 110 pounds per minute. Instead of anhydrous liquid ammonia, anhydrous ammonia gas can be used. The supply of phosphoric acid and ammonia is controlled and metered in proportions to give the desired grade of 18–47–0

($N-P_2O_5$)

di-ammonium phosphate.

For satisfactory results, the amount of di-ammonium phosphate recirculated as a bed for the carrier of phosphoric acid should be approximately three times product made. However, the quantity of material for recirculation can be varied to suit the concentration of $P_2O_5$ in in the phosphoric acid. In this operation, it is important to control the amount of moisture. The concentration of phosphoric acid can be varied, for example, from about 35% $P_2O_5$ up to about 50% $P_2O_5$ by varying the quantity of recirculation. Of course, operations may be conducted at lower or higher concentrations of phosphoric acid, but the foregoing concentrations are preferred for industrial operations. With about three times a recirculation load of product made, the concentration of phosphoric acid should preferably be about 40% to 43% of $P_2O_5$. For best results, moisture ranges of about 1% to 8% are used, although a wider range may be employed. Too much moisture, however, induces caking and agglomeration. Granulation of the product is accomplished by film build-up of the nuclei with freshly made product. Sufficient moisture must be maintained for the chemical reaction and to help shape the particles during rotation. Chemical control is maintained by a pH examination of product discharge from the rotating drum. Usually the pH should be controlled within a range of more than about 7.0 to less than about 8.0 and preferably within a range of about 7.4 to about 7.8 and particularly about 7.6 to about 7.8 for the production of the 18–47–0 product. A suitable pH meter or pH colorimeter can be used and a control of about plus or minus 0.20 pH is recommended.

It has been found as a result of testing in actual operations that grade and pH can be more efficiently controlled by another test. In order to get the phosphoric acid to take up its full charge of ammonia and obtain a grade 18–47–0 (N—$P_2O_5$) di-ammonium phosphate, the bed is charged with an excess of ammonia. Since the excess is large, say approximately 15%, the loss of unreacted ammonia to open air cannot be economically sustained and a recovery system for the unreacted ammonia is necessary. The ammonia control is maintained by conducting simple titration tests on the recirculating scrubbing phosphoric acid. These tests are conducted by titrating samples with alkali to the end-point of methyl purple and taking a burette reading; adding phenolphthalein, titrating to end-point thereof and taking a total burette reading. The first reading divided into the total reading gives a ratio. When a ratio of about 2.80 is maintained, the ratio of nitrogen to $P_2O_5$ in the product will be correct. In other words, the grade will be maintained close to 18–47–0 (N—$P_2O_5$). If the ratio goes above 2.80, too much ammonia or not enough acid is being added; if the ratio goes under 2.80, not enough ammonia is being added, or too much phosphoric acid is being used. Since ammonia or nitrogen is being fed to the reactor from two sources, this last test is necessary. Since the reactor is only about 85% efficient in absorbing the free ammonia being fed, about 15% of the ammonia gas introduced is unreacted and is recovered in the ammonia recovery system by recirculated phosphoric acid, of which, a portion is continuously being fed to the reactor. Finally, an equilibrium is reached whereby approximately 85% of the ammonia introduced is absorbed by the phosphoric acid in the bed of the reactor and approximately 15% of the ammonia introduced is unreacted in the bed and is absorbed in the ammonia recovery system by recirculated phosphoric acid which is later used in the reactor.

The rotating drum is unique because it functions as a neutralization vessel, mixer, granulator, and partial dryer. While the drum is rotating, anhydrous ammonia is introduced at the bottom of the bed and phosphoric acid is simultaneously sprayed preferably on the top of the bed. Phosphoric acid covers the exposed surfaces and films of product are produced and grow on the nuclei particles. The heat of neutralization drives off water as steam. Condensation of this steam in the drum is prevented by introducing some air, either hot or cold, through the top of the drum with the use of a suction fan which pulls it through. Results of actual operations demonstrate that when hot air is introduced through the reactor and properly controlled, the reactor serves as a complete dryer. The temperature of the gases leaving the reactor is controlled at about 170° F. At this temperature, the air necessary to carry the water vapor away is reduced to about one-half of the air required if the air is not heated. The exit gases from the reactor could be maintained somewhat higher but if the temperature in the reactor gets too high, the reaction will not proceed all the way to di-ammonium phosphate. The use of hot air through the reactor eliminates the dryer, reduces the size of the reactor, cyclone dust catcher for the reactor, the ammonia recovery system and the fan as all these pieces of equipment sizes are dependent on the volume of gases to be handled. The hot air also assures a dry free-flowing bed in the reactor. This facilitates good agitation and mixing and eliminates caking and build-up on the sides of the reactor to a minimum. The hot air likewise assures a more uniform granular product. It will thus be observed that the rotating drum performs several functions whereas in prior art processes additional equipment or larger equipment was needed to perform each of the various functions, frequently including extra filtering and crystallization operations.

Neutralization in the present process is effected in a moving bed of solid material acting as a carrier of phosphoric acid while at the same time granulation and mixing are accomplished as well as partial drying. Complete drying can be effected provided hot air is passed through the reactor. It can readily be understood by those skilled in the art that potash salts can be introduced which would give a complete fertilizer and that nitrate solutions high in nitrogen but low in water content or a combination of nitrogen solution and anhydrous ammonia could be introduced to raise the nitrogen content. Mixtures of phosphoric acid and sulfuric acid could likewise be used.

For the purpose of giving those skilled in the art a better understanding of the invention, the following illustrative example is given:

A bed is established which is composed of about 4,600 parts by weight of di-ammonium phosphate. This bed consisted of about 2,600 parts by weight of −8 +12 mesh and about 2,000 parts by weight of −12 mesh material and contained about 17.20% nitrogen and about 46.87% A.P.A. While rotating the drum, about 341 parts by weight of anhydrous ammonia is continuously introduced in the bottom of the bed, and about 43% $P_2O_5$ phosphoric acid is continuously sprayed on top of the bed. It usually takes not less than about five minutes for the product to go through the drums. More time is required depending on the tonnage produced and the expected particle size. The final product obtained had about 2.00% of moisture and analyzed about 48.03% total $P_2O_5$, about 0.02% citrate insoluble $P_2O_5$, about 48.01% A.P.A., and about 17.51% nitrogen.

Results indicate that ammoniation of the acid can be effected with a recovery or fixation recovery of the ammonia by returning the vapors from the rotating drum to be re-absorbed by the incoming phosphoric acid and should reduce losses of ammonia to less than about 1%. Other mixes were made in which the nitrogen content exceeded 18% and $P_2O_5$ decreased to 46.50%. Control of the pH to a value of about 7.6 should insure a stable 18–47–0 (N—$P_2O_5$) grade of product. Hot air can be used as a draft in the reaction vessel and enough moisture driven off to be able to reduce recirculation loads. In addition, other advantages are obtained by using hot air as disclosed hereinbefore. Temperature control is not critical provided temperatures are maintained within the mass of particles in the bed below the decomposition temperature of di-ammonium phosphate. The dissociation pressure of the dry solid di-ammonium phosphate is given by Waggaman as about 5 mm. of mercury at 100° C. and about 30 mm. at 125° C. As the 18–47–0 grade is not a pure di-ammonium salt, it would probably take a higher heat to decompose it.

The present invention can be carried into practice with suitable equipment but a satisfactory arrangement is illustrated in Fig. 1 of the drawing. The reference character P designates a supply of liquid phosphoric acid. Such acid is preferably used in scrubber S which is preferably a spray tower with a mist trap to absorb ammonia carried by a current of air coming from rotating drum or reactor granulator R–D via line L—M. The current of air is supplied to drum R–D via line L—A. To induce the current of air through drum R–D, a fan F is provided at the discharge end of the drum.

Phosphoric acid coming from scrubber S goes to meter M and thence to the drum R–D via a distribution or spray system S–S, anhydrous liquid ammonia supply is designated by reference character A and is conveyed to meter M and thence to sparger S–P for distribution at the bottom of a bed of di-ammonium phosphate B. As a general rule, stoichiometric proportions of acid and ammonia are metered to rotating drum R–D which acts as a reactor granulator or reaction vessel. Neutralization occurs in the films of acid on the surface of di-ammonium phosphate.

From the rotating drum, the final product is discharged and goes to dryer R–R. In the dryer, the moisture content is reduced to about 3.00% to 1.00% and preferably 2.00%. The dried product then goes to a set of screens S–C. After screening, the finished product is discharged via line L—P. Part of the discharged product is recirculated via line L—R. Oversize product is taken off via line L—O and goes to grinding mill G for grinding to appropriate sizes. Fines are returned via line L—F. The ground oversize, fines and the make-up from screened product are all returned to bed B in reactor granulator or drum R–D for further treatment.

Referring to Fig. 2 of the drawing, an arrangement of equipment is illustrated when the present process is carried into practice witthout the use of a dryer. A supply of recycled di-ammonium phosphate comes from surge bin 53 and is conveyed by belt CB to a chute where the recycle is discharged into the rotating reactor 56. This recycled material supplies the di-ammonium phosphate bed Z in the reactor. Anhydrous ammonia is metered through meter 52 and flows via line 30 to a sparger Y submerged in the bed of di-ammonium phosphate. At the same time, partially neutralized phosphoric acid is supplied by pump 68 via line 4 to the phosphoric acid spray-line X above the di-ammonium phosphate bed in the reactor. The phosphoric acid flow is controlled by meter 62. Hot combustion gases are supplied by burner 57 and the hot combustion gases are introduced via pipe 21 into the reactor. Extra unheated air is introduced in the open end of the reactor at point 20. The hot combustion gases and air so mentioned are introduced into reactor 56 via means of a suction fan 61. The suction fan 61 pulls the gases, along with the unreacted ammonia gas, through gas reactor discharge pipe 22. The gases go then to gas cyclone intake 23 into cyclone 58 and out of the top of cyclone 58 into gas inlet 24 to venturi 59 and through gas inlet 25 to mist separator 60. From mist separator 60, the gases are drawn through gas mist separator discharge 26 and through fan 61 and out to atmosphere via fan discharge 27. The phosphoric acid is supplied by mixing tank 64 and is transferred by pump 71 via pipe 1 to surge tank 63. Pump 70 supplies phosphoric acid through meter 62 via line 2 to venturi scrubber 59. The incoming phosphoric acid absorbs ammonia contained in the exhaust gases from the gas discharge pipe 22 from the reactor 56. The partially neutralized phosphoric acid goes from venturi scrubber via inlet 25 to mist separator 60 and from mist separator 60 the phosphoric acid drops by gravity into constant level tank 65. A continuous portion of the acid in the constant level tank 65 is drawn off at the bottom by pump 68 to feed the reactor 56 via line 4 and a constant level is maintained in tank 65 by means of level control 66. A continuous volume of the acid is recycled from the bottom of the constant level tank 65 via pump 67 through pipe 5 to supply acid to venturi scrubber 59.

Solid product discharges from reactor 56 onto belt A and from belt A onto belt B and thence into foot of elevator 51, and from elevator 51 via D to screens 50. Oversizes from screens 50 go via conveyor K to a mill 55 and via C to elevator 51. The fines from screens 50 go via conveyor F to surge bin 53. The production takeoff of product size goes via conveyor H to product bin 54. The remaining portion of product or a fraction thereof may be diverted via conveyor J to mill 55 and via conveyor C to elevator 51 if more fines are needed in the recycle. The rest of the product size goes via conveyor G to surge bin 53. In the event that no further fines are needed, all of the surplus product size may go via conveyor G to surge supply bin 53 for recycle and further treatment in the process. The dust product from cyclone 58 is conveyed via E to surge bin 53.

In the present specification, the word "approximate" is used as the grade of di-ammonium phosphate will vary somewhat depending on the amount of impurities contained in the phosphoric acid.

It is to be noted that the present invention is not to be confused with prior processes in which neutralization is accomplished by bringing the anhydrous ammonia and liquid phosphoric acid together in an agitator reaction vessel. The neutralization occurs entirely in the liquid stage and the project at this neutralization stage is a one-step function. Due to too much thickening of the solids, limitations are likewise imposed on the concentration percentage of $P_2O_5$ in the acid. Such limitations are involved in the so-called "Missouri Farmer" and "TVA" process of the prior art.

The present application is a continuation-in-part application of applicants' co-pending application Serial No. 600,235, filed July 26, 1956, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An improved wet process of directly producing substantially dry, solid, granulated di-ammonium phosphate having a composition of approximately 18–47–0

$$(N-P_2O_5)$$

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of diammonium phosphate in a rotating reactor-granulator having an inlet at one end and an outlet at the other; the bulk of said particles having fineness within a range of sizes of about minus 10 to about plus 60 mesh with the remainder containing minus 60 mesh, said particles furnishing sufficient carrier and supply surface for liquid phosphoric acid and to furnish nuclei for granulation; introducing a feed supply of said di-ammonium phosphate having the aforesaid fineness via said inlet of said reactor-granulator to maintain said horizontal, rotating solid bed of contacting particles; rolling the contacting solid particles in said solid bed over and over to cause contacting of adjacent particles and to cause a rolling action of the particles and a movement substantially horizontally from said inlet to said outlet of said rotating reactor-granulator; feeding liquid phosphoric acid of the wet acid process type over the contacting solid particles in said horizontal, rotating, solid bed to cover and wet substantially the entire surfaces of said contacting particles with liquid films of said acid; said films contacting each other between adjacent contacting particles to form a solid bed; simultaneously diffusing ammonia vapor upwardly from near the bottom through said bed of wet contacting particles and through the liquid films on and around the surface of said wet contacting particles at a velocity insufficient to separate said contacting particles of di-ammonium phosphate, said phosphoric acid and ammonia being proportioned to each other to provide ammonia in excess of the stoichiometric amount required for the neutralization of said liquid phosphoric acid of the wet acid type and the formation of coatings of solid di-ammonium phosphate of approximately 18–47–0

$$(N-P_2O_5)$$

composition; controlling the pH in the solid bed containing said wet contacting particles from more than about 7.0 to less than about 8.0; controlling the temperature within said solid bed to one effective to drive off water as steam at about 212° F. at atmospheric pressure; withdrawing escaping unreacted ammonia vapor in excess of stoichiometric amount from said solid bed; passing said escaping unreacted ammonia vapor coming from the top of said solid bed through a scrubber; absorbing said ammonia in liquid phosphoric acid of the wet acid process type in said scrubber to neutralize said excess ammonia vapor and to prevent the escape and loss thereof and to provide partially neutralized phosphoric acid; recycling said partially neutralized liquid phosphoric acid and feeding it into said reactor-granulator for wetting contacting particles in said solid bed; withdrawing from said outlet of said rotating reactor-granulator directly-produced, substantially dry, solid particles of di-ammonium phosphate having a composition of approximately 18–47–0 (N—$P_2O_5$) in an amount corresponding approximately to the amount of feed-supply; recovering a minor fraction of said withdrawn solid, granulated particles covered with films of newly formed di-ammonium phosphate whereby a finished product of di-ammonium phosphate having a composition of approximately 18–47–0

(N—$P_2O_5$)

is produced as a substantially dry product without an appreciable loss of ammonia; and recycling a major fraction of said withdrawn particles having a range of sizes of about minus 10 mesh to about plus 60 mesh through the aforesaid operations to provide feed-supply of di-ammonium phosphate particles to be introduced into the inlet of said reactor-granulator to maintain the said horizontal, rotating, solid bed; said recycled particles being approximately three times the amount of the minor fraction of withdrawn product whereby said 18–47–0

(N—$P_2O_5$)

di-ammonium phosphate is produced with a substantially negligible loss of ammonia and as constituted of substantially uniform granules containing product size comprising minus 10 mesh to plus 14 mesh.

2. An improved wet process of directly producing substantially dry, solid, granulated di-ammonium phosphate having a composition of approximately 18–47–0

(N—$P_2O_5$)

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 10 to about plus 60 mesh with the remainder containing minus 60 mesh and the said particles furnishing sufficient carrier and supply surface for liquid phosphoric acid and to furnish nuclei for granulation; introducing a feed supply of said di-ammonium phosphate having the aforesaid fineness via said inlet of said reactor-granulator to maintain said horizontal, rotating solid bed of contacting particles; turning the particles in said solid bed over and over to cause contacting of adjacent particles while causing a movement of contacting particles substantially horizontally from said inlet to said outlet of said reactor-granulator; distributing liquid phosphoric acid of the wet acid process type over the contacting solid particles in said horizontal, rotating, solid bed to cover and wet substantially the entire surfaces of contacting particles with liquid films of said acid; said films contacting each other between adjacent contacting particles; simultaneously discharging ammonia vapor within and near the bottom of said bed and flowing said ammonia vapor upwardly between said wet contacting particles and through the liquid films on and around the surfaces thereof at a velocity insufficient to separate said contacting particles; said phosphoric acid and ammonia being proportioned to each other to provide ammonia in excess of the stoichiometric amount required for the neutralization of said liquid phosphoric acid and the formation of solid di-ammonium phosphate of approximately 18–47–0 (N—$P_2O_5$) composition; controlling the pH in the solid bed containing said wet contacting particles from more than about 7.0 to less than about 8.0; maintaining temperatures within said solid bed to those effective to drive off water as steam at about 212° F. at atmospheric pressure; withdrawing escaping unreacted ammonia vapor in excess of stoichiometric amount from said solid bed; passing said escaping unreacted ammonia vapor coming from the top of said solid bed through a scrubber; absorbing said ammonia in liquid phosphoric acid of the wet acid process type in said scrubber to neutralize said excess ammonia vapor and to prevent the escape and loss thereof and to provide partially neutralized phosphoric acid; recycling said partially neutralized liquid phosphoric acid and feeding it into said reactor-granulator for wetting contacting particles in said solid bed; withdrawing from said outlet of said rotating reactor-granulator directly-produced, substantially dry, solid particles of di-ammonium phosphate having a composition of approximately 18–47–0 (N—$P_2O_5$) in an amount corresponding approximately to the amount of feed-supply; dividing said withdrawn particles of di-ammonium phosphate into a major fraction and a minor fraction; said major fraction being approximately three times the amount of the minor fraction; recycling the said major fraction of said withdrawn particles having a range of sizes of about minus 10 mesh to about plus 60 mesh through the aforesaid operations to provide feed-supply of di-ammonium phosphate particles to be introduced into the inlet of said reactor-granulator to maintain the said horizontal, rotating, solid bed; and recovering the said minor fraction of said withdrawn solid, granulated particles whereby a finished product of di-ammonium phosphate having a composition of approximately 18–47–0 (N—$P_2O_5$) is produced as a substantially dry product without an appreciable loss of ammonia and as constituted of substantially uniform granules containing product size comprising minus 10 mesh to plus 14 mesh.

3. An improved wet process of directly producing substantially dry, solid, granulated di-ammonium phosphate having a composition of approximately 18–47–0

(N—$P_2O_5$)

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 14 to about plus 20 mesh with the remainder containing minus 20 mesh and the said particles furnishing sufficient carrier and supply surface for liquid phosphoric acid and to furnish nuclei for granulation; introducing a feed supply of said di-ammonium phosphate having the aforesaid fineness via said inlet of said reactor-granulator to maintain said horizontal, rotating solid bed of contacting particles; rotating the particles in said solid bed over and over to cause contacting of adjacent particles while causing a movement of particles substantially horizontally from said inlet to said outlet of said reactor-granulator; spraying liquid phosphoric acid of the wet acid process type containing about 35% to about 50% $P_2O_5$ over the top of said horizontal, rotating, solid bed containing said contacting particles to cover and wet the same with liquid films of said acid; said films contacting each other between adjacent contacting particles; controlling the moisture in said films in sufficient amount of about 1% to about 8% to facilitate neutralization of phosphoric acid with ammonia and the reaction to form di-ammonium phosphate and the granulation thereof; simultaneously diffusing ammonia vapor within the lower part of said bed and flowing the ammonia vapor upwardly between wet contacting particles and through liquid films on and around the surfaces thereof at a velocity insufficient to separate said contacting particles; said phosphoric acid and ammonia being proportioned to each other to provide ammonia in excess of the stoichiometric amount required for the neutralization of said liquid phosphoric acid and the formation of solid di-ammonium phosphate of approximately 18–47–0 (N—$P_2O_5$) composition; controlling the pH in the solid bed containing said wet contacting particles from about 7.4 to about 7.8; maintaining temperatures within said solid bed to those effective to drive off water as steam at about 212° F. at atmospheric pressure; withdrawing escaping unreacted ammonia vapor in excess of stoichiometric amount from said solid bed; scrubbing said escaping unreacted ammonia vapor coming from the top of said solid bed with liquid phosphoric acid of the wet acid process type to neutralize said excess ammonia vapor and to prevent the escape and loss thereof and to provide partially neutralized phosphoric acid; recycling said partially neutralized liquid phosphoric acid and feeding it into said reactor-granulator for wetting contacting particles in said solid bed; withdrawing discharged product from said outlet of said rotating reactor-granulator; said discharged product constituting directly-produced finished product of substantially dry, solid particles of di-ammonium phosphate having a composition of approximately 18–47–0 (N—$P_2O_5$) and representing an amount corresponding approximately to the amount of feed-supply; recycling a major fraction of said discharged product containing particles having fineness within a range of sizes of about minus 14 mesh to about plus 20 mesh through the aforesaid operations to provide feed-supply of di-ammonium phosphate particles to be introduced into the inlet of said reactor-granulator to maintain the said horizontal, rotating, solid bed; said major fraction being approximately three times the amount of a minor fraction; and recovering the said minor fraction of said discharged product whereby a finished product of di-ammonium phosphate having a composition of approximately 18–47–0 (N—$P_2O_5$) is produced as a substantially dry product without an appreciable loss of ammonia and as constituted of substantially uniform granules containing product size comprising minus 10 mesh to plus 14 mesh.

4. An improved wet process of directly producing substantially dry, solid, granulated di-ammonium phosphate having a composition of approximately 18–47–0

(N—$P_2O_5$)

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 14 to about plus 20 mesh with the remainder containing minus 20 mesh and the said particles furnishing sufficient carrier and supply surface for liquid phosphoric acid and to furnish nuclei for granulation; introducing a feed supply of said di-ammonium phosphate having the aforesaid fineness via said inlet of said reactor-granulator to maintain said horizontal, rotating solid bed of contacting particles; rotating the particles in said solid bed over and over to cause contacting of adjacent particles while causing a movement of particles substantially horizontally from said inlet to said outlet of said reactor-granulator; feeding liquid phosphoric acid of the wet acid process type containing about 40% to about 43% $P_2O_5$ within the upper part of said horizontal, rotating, solid bed and over contacting particles to cover and wet substantially the same with liquid films of said acid; said films contacting each other between adjacent contacting particles; controlling the moisture in said films in sufficient amount of about 1% to about 3% to facilitate neutralization of phosphoric acid with ammonia and the reaction to form di-ammonium phosphate and the granulation thereof; simultaneously diffusing ammonia vapor within the lower part of said bed and flowing the ammonia vapor upwardly between said wet contacting particles and through liquid films on and around the surfaces thereof at a velocity insufficient to separate said contacting particles; said phosphoric acid and ammonia being proportioned to each other to provide amomnia in large excess of the stoichiometric amount required for the neutralization of said liquid phosphoric acid and the formation of solid di-ammonium phosphate of approximately 18–47–0 (N—$P_2O_5$) composition; controlling the pH in the solid bed containing said wet contacting particles from about 7.4 to about 7.8; maintaining temperatures within said solid bed to those effective to drive off water as steam at about 212° F. at atmospheric pressure and those in the gases leaving the reactor-granulator with escaping unreacted ammonia vapor up to about 170° F.; withdrawing said gases containing escaping unreacted ammonia vapor in excess of stoichiometric amount from said solid bed; passing said escaping unreacted ammonia vapor coming from the top of said solid bed through a scrubber; absorbing said ammonia in liquid phosphoric acid of the wet acid process type in said scrubber to neutralize said excess ammonia vapor and to prevent the escape and loss thereof and to provide partially neutralized phosphoric acid; recycling said partially neutralized liquid phosphoric acid and feeding it into said reactor-granulator for wetting contacting particles in said solid bed; withdrawing from said outlet of said rotating reactor-granulator directly-produced, substantially dry, solid particles of di-ammonium phosphate having a composition of approximately 18–47–0

(N—$P_2O_5$)

in an amount corresponding approximately to the amount of feed-supply; dividing said withdrawn particles of di-ammonium phosphate into a major fraction and a minor fraction, said major fraction being approximately three times the amount of the minor fraction; recycling the said major fraction of said withdrawn particles having a range of sizes of about minus 14 mesh to about plus 20 mesh through the aforesaid operations to provide feed-supply of di-ammonium phosphate particles to be introduced into the inlet of said reactor-granulator to maintain the said horizontal, rotating, solid bed; recovering the said minor fraction of said withdrawn solid, granulated particles whereby a finished product of di-ammonium phosphate having a composition of approximately 18–47–0 (N—$P_2O_5$) is produced as a substantially dry product with a loss of ammonia less than about 1% and as constituted of substantially uniform granules containing product size comprising minus 10 mesh to plus 14 mesh.

5. An improved wet process of directly producing substantially dry, solid, granulated di-ammonium phosphate having a composition of approximately 18–47–0

(N—$P_2O_5$)

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 10 to about plus 60 mesh with the remainder containing minus 60 mesh and the said particles furnishing sufficient carrier and supply surface for liquid phosphoric acid and to furnish nuclei for granulation; continuously introducing a feed supply of said di-ammonium phosphate having the aforesaid fineness via said inlet of said reactor-granulator to maintain said horizontal, rotating solid bed of contacting particles; rotating the particles in said solid bed over and over to cause contacting of adjacent particles while causing a movement of the particles substantially horizontally from said inlet to said outlet of said reactor-granulator; continuously feeding liquid phosphoric acid of the wet acid process type over the upper part of said horizontal, rotating, solid bed containing said contacting particles to cover and wet the same with liquid films of said acid; said films contacting each other between adjacent contacting particles; simultaneously and continuously diffusing ammonia vapor within the lower part of said bed and flowing the ammonia vapor upwardly between wet contacting particles and through liquid films on and around the surfaces thereof at a velocity insufficient to separate said contacting particles; separately and continuously controlling the feeding of said phosphoric acid and said ammonia to provide ammonia in excess of the stoichiometric amount required for the neutralization of said liquid phosphoric acid and the formation of solid di-ammonium phosphate of approximately 18–47–0 (N—P$_2$O$_5$) composition; continuously controlilng the pH in the solid bed containing said wet contacting particles from more than about 7.0 to less than about 8.0; continuously maintaining temperatures within said solid bed to those effective to drive off water as steam at about 212° F. at atmospheric pressure; continuously withdrawing escaping unreacted ammonia vapor in excess of stoichiometric amount from said solid bed; continuously scrubbing said escaping unreacted ammonia vapor coming from the top of said solid bed with liquid phosphoric acid of the wet acid process type to neutralize said excess ammonia vapor and to prevent the escape and loss thereof and to provide partially neutralized phosphoric acid; continuously recycling said partially neutralized liquid phosphoric acid and feeding it into said reactor-granulator for wetting contacting particles in said solid bed; continuously withdrawing discharged product from said outlet of said rotating reactor-granulator; said discharged product constituting directly-produced finished product of substantially dry, solid particles of di-ammonium phosphate having a composition of approximately 18–47–0 (N—P$_2$O$_5$) and representing an amount corresponding approximately to the amount of feed-supply; continuously recycling a major fraction of said discharged product containing particles having fineness within a range of sizes of about minus 10 mesh to about plus 60 mesh through the aforesaid operations to provide feed-supply of di-ammonium phosphate particles to be introduced into the inlet of said reactor-granulator to maintain the said horizontal, rotating, solid bed; said major fraction being approximately three times the amount of a minor fraction; and continuously recovering the said minor fraction of said discharged product whereby a finished product of di-ammonium phosphate having a composition of approximately 18–47–0 (N—P$_2$O$_5$) is produced as a substantially dry product without an appreciable loss of ammonia and as constituted of substantially uniform granules containing product size comprising minus 10 mesh to plus 14 mesh.

6. An improved wet process of directly producing substantially dry, solid, granulated di-ammonium phosphate having a composition of approximately 18–47–0

(N—P$_2$O$_5$)

and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 10 to about plus 60 mesh with the remainder containing minus 60 mesh and the said particles furnishing sufficient carrier and supply surface for liquid phosphoric acid and to furnish nuclei for granulation; introducing a feed-supply of said di-ammonium phosphate having the aforesaid fineness via said inlet of said reactor-granulator to maintain said horizontal, rotating solid bed of contacting particles; rotating the particles in said solid bed over and over to cause contacting of adjacent particles while causing a rolling movement of paticles substantially horizontally from said inlet to said outlet of said reactor-granulator; feeding liquid phosphoric acid of the wet acid process type over the upper part of said horizontal, rotating, solid bed containing said contacting particles to cover and wet the same with liquid films of said acid; said films contacting each other between adjacent contacting particles; controlling the moisture in said films in sufficient amount of about 1% to about 8% to facilitate neutralization of phosphoric acid with ammonia and the reaction to form di-ammonium phosphate and granulation thereof; simultaneously diffusing ammonia vapor within the lower part of said bed and flowing the ammonia vapor upwardly between said wet contacting particles and through liquid films on and around the surfaces thereof at a velocity insufficient to separate said contacting particles of di-ammonium phosphate, said phosphoric acid and ammonia being proportioned to each other to provide ammonia in excess of the stoichiometric amount required for the neutralization of said liquid phosphoric acid and the formation of solid di-ammonium phosphate of approximately 18–47–0 (N—P$_2$O$_5$) composition; controlling the pH in the solid bed containing said wet contacting particles from more than about 7.0 to less than about 8.0; maintaining temperatures within said solid bed to those effective to drive off water as steam at about 212° F. at atmospheric pressure; withdrawing escaping unreacted ammonia vapor in excess of stoichiometric amount from said solid bed; scrubbing said escaping unreacted ammonia vapor coming from the top of said solid bed with liquid phosphoric acid of the wet acid process type to neutralize said excess ammonia vapor and to prevent the escape and loss thereof and to provide partially neutralized phosphoric acid; recycling said partially neutralized liquid phosphoric acid and feeding it into said reactor-granulator for wetting contacting particles in said solid bed; maintaining an ammonia control by preserving a ratio of about 2.80 obtained by dividing a first burette reading provided by titrating phosphoric acid used in the scrubber to the end point of methyl purple into a second total burette reading provided by titrating to the end point of phenolphthalein thereby assuring proper ratio of nitrogen to P$_2$O$_5$ and assuring the composition of the finished product to about 18–47–0 (N—P$_2$O$_5$); withdrawing discharged product from said outlet of said rotating reactor-granulator; said discharged product constituting directly-produced finished product of substantially dry, solid particles of di-ammonium phosphate having a composition of approximately 18–47–0 (N—P$_2$O$_5$) and representing an amount corresponding approximately to the amount of feed-supply; recycling a major fraction of said discharged product containing particles having fineness within a range of sizes of about minus 10 mesh to about plus 60 mesh through the aforesaid operations to provide feed-supply of di-ammonium phosphate particles to be introduced into the inlet of said reactor-granulator to maintain the said horizontal, rotating, solid bed; said major fraction being approximately three times the amount of a minor fraction; and recovering the said minor fraction of said discharged product whereby a finished product of di-ammonium phosphate having a composition of approximately 18–47–0 (N—$P_2O_5$) is produced as a substantially dry product without an appreciable loss of ammonia and as constituted of substantially uniform granules containing product size comprising minus 10 mesh to plus 14 mesh.

7. An improved wet process of directly producing substantially dry, solid, granulated di-ammonium phosphate having a composition of approximately 18–47–0 (N—$P_2O_5$) and constituted of substantially uniform granules containing product size comprising minus 10 mesh to plus 14 mesh which comprises establishing a substantially horizontal-moving, rotating, solid bed of at least about 7 inches and not more than about 36 inches of contacting solid particles of di-ammonium phosphate in a rotating reactor-granulator having an inlet at one end and an outlet at the other; the bulk of said particles having fineness within a range of sizes of about minus 10 to about plus 60 mesh with the remainder containing minus 60 mesh and the said particles furnishing sufficient carrier and supply surface for liquid phosphoric acid and to furnish nuclei for granulation; introducing a feed supply of said di-ammonium phosphate having the aforesaid fineness via said inlet of said reactor-granulator to maintain said horizontal, rotating solid bed of contacting particles; rotating the particles in said solid bed over and over to cause contacting of adjacent particles while causing a movement of particles substantially horizontally from said inlet to said outlet of said reactor-granulator; feeding liquid phosphoric acid of the wet acid process type containing about 35% to about 50% $P_2O_5$ within the upper part of said horizontal, rotating, solid bed and of contacting particles to cover and wet substantially the same with liquid films of said acid; said films contacting each other between adjacent contacting particles; controlling the moisture in said films in sufficient amount of about 1% to about 8% to facilitate neutralization of phosphoric acid with ammonia and the reaction to form di-ammonium phosphate and granulation thereof; simultaneously diffusing ammonia vapor within the lower part of said bed and flowing the ammonia vapor upwardly between said wet contacting particles and through liquid films on and around the surfaces thereof at a velocity insufficient to separate said contacting particles; said phosphoric acid and ammonia being proportioned to each other to provide ammonia in excess of the stoichiometric amount required for the neutralization of said liquid phosphoric acid and the formation of solid di-ammonium phosphate of approximately 18–47–0 (N—$P_2O_5$) composition; controlling the pH in the solid bed containing said wet contacting particles from more than about 7.0 to less than about 8.0; maintaining tempreatures within said solid bed to those effective to drive off water as steam at about 212° F. at atmospheric pressure; combusting fuel in said reactor-granulator and passing a current of hot combustion gases including air to move through the upper part of said rotating reactor-granulator to prevent the condensation of steam and to remove escaped and unreacted ammonia and any other vapors evolved by the aforesaid neutralization at a temperature of about 170° F.; withdrawing escaping unreacted ammonia vapor in excess of stoichiometric amount from said solid bed; passing said escaping unreacted ammonia vapor coming from the top of said solid bed through a scrubber; absorbing said ammonia in liquid phosphoric acid of the wet acid process type in said scrubber to neutralize said excess ammonia vapor to to prevent the escape and loss thereof and to provide partially neutralized phosphoric acid; recycling said partially neutralized liquid phosphoric acid and feeding it into said reactor-granulator for wetting contacting particles in said solid bed; withdrawing from said outlet of said rotating reactor-granulator directly-produced, substantially dry, solid particles of di-ammonium phosphate having a composition of approximately 18–47–0 (N—$P_2O_5$) in an amount corresponding approximately to the amount of feed-supply; screening said solid, dry particles into oversize greater than particles having sizes about minus 10 to plus 14 mesh, fines smaller than particles having sizes of about minus 60 mesh, and the intermediate product size having sizes between said oversize and fines; separating a portion of said intermediate product size as the finished product and the remainder for recirculation through the said rotating solid bed; grinding said oversize into a ground mass; and returning said ground mass, said fines and said remainder of di-ammonium phosphate to the inlet of the reactor-granulator for incorporation in said rotating, solid bed as recycled feed-supply; said recycled feed-supply being about three times the amount of said finished product whereby a finished product of di-ammonium phosphate having a composition of approximately 18–47–0 (N—$P_2O_5$) is produced as a substantially dry product without an appreciable loss of ammonia and as constituted of substantially uniform granules containing product size comprising minus 10 mesh to plus 14 mesh.

8. An improved wet process of directly producing substantially dry, solid, granulated di-ammonium phosphate having a composition of approximately 18–47–0 (N—$P_2O_5$) and constituted of substantially uniform granules containing product size comprising minus 10 mesh to plus 14 mesh which comprises establishing a substantially horizontal-moving, rotating, solid bed of contacting solid particles of di-ammonium phosphate in a rotating reactor-granulator having an inlet at one end and an outlet at the other; said bed containing particles having fineness within a range of sizes of about minus 10 to about plus 60 mesh with the remainder containing minus 60 mesh and the said particles furnishing sufficient carrier and supply surface for liquid phosphoric acid and to furnish nuclei for granulation; adjusting the depth of said horizontal, rotating, solid bed of contacting particles substantially horizontally from said inlet to said outlet and to a substantial and sufficient amount to permit ammonia to react with and neutralize phosphoric acid to produce di-ammonium phosphate; introducing a feed supply of said di-ammonium phosphate having the aforesaid fineness via said inlet of said reactor-granulator to maintain said horizontal, rotating solid bed; rotating the contacting solid particles in said solid bed over and over to cause contacting of adjacent particles; subjecting said rotating, solid bed to movement substantially horizontally from said inlet to said outlet of said reactor-granulator; flowing liquid phosphoric acid through said horizontal, rotating solid bed and over the contacting solid particles from the upper part of said horizontal, rotating, solid bed to cover and wet exposed surfaces of said contacting particles of di-ammonium phosphate with liquid films of said acid; said films contacting each other between adjacent contacting particles; controlling the moisture in said films in sufficient amount to facilitate neutralization of phosphoric acid with ammonia and the reaction to form di-ammonium phosphate and the granulation thereof; simultaneously diffusing ammonia vapor through the lower part of said bed and flowing the ammonia vapor upwardly between said wet contacting particles and through liquid films on and around the surfaces thereof at a velocity insufficient to separate said contacting particles; said phosphoric acid and ammonia being proportioned to each other to provide ammonia in excess of stoichiometric amount required for reaction with liquid phosphoric acid in the films on said wet contacting particles to effect neutralization of said phosphoric acid in said liquid films and formation of solid di-ammonium phosphate of approximately 18–47–0 (N—$P_2O_5$) composition; separately controlling the introduction into said reactor-granulator of said phosphoric acid and of said ammonia vapor to the aforesaid approximate proportions for making di-ammonium phosphate on said contacting particles in said horizontal, rotating solid bed; controlling the pH in the solid bed containing said wet contacting particles from more than about 7.0 to less than about 8.0; controlling the temperatures within said solid bed to those effective to drive off water as steam at about 212° F. at atmospheric pressure; withdrawing escaping unreacted ammonia vapor in excess of stoichiometric amount from said solid bed; passing said escaping unreacted ammonia vapor coming from the top of said solid bed through a scrubber; absorbing said ammonia in liquid phosphoric acid in said scrubber to neutral said excess ammonia vapor and to prevent the escape and loss thereof and to provide partially neutralized phosphoric acid; maintaining an ammonia control by preserving a ratio of a substantially constant factor obtained by dividing a first burette reading provided by titrating phosphoric acid used in scrubber to the end point of methyl purple into a second total burette reading provided by titrating to the end point of phenolphthalein thereby assuring proper ratio of nitrogen to $P_2O_5$ and assuring the composition of the di-ammonium phosphate product; moving hot gases containing air through the upper part of the reactor-granulator to induce the escape of unused and unreacted ammonia vapor in excess of stoichiometric amount from above the top of said horizontally-moving rotating, solid bed; conducting the said hot gases containing said escaped and unreacted ammonia vapor coming from the top of said solid bed upwardly through a scrubber; contacting said upwardly flowing ammonia in downwardly flowing liquid phosphoric acid in said scrubber to neutralize said excess ammonia vapor and to prevent the escape and loss thereof and to provide partially neutralized phosphoric acid; recycling a substantially constant volume of said partially neutralized liquid phosphoric acid and introducing it into said reactor-granulator for wetting contacting particles in said solid bed; withdrawing from said outlet of said rotating reactor-granulator directly-produced, substantially dry, solid particles of di-ammonium phosphate in an amount corresponding approximately to the amount of feed-supply; recovering a minor fraction of said withdrawn solid, granulated particles whereby a finished product of di-ammonium phosphate is produced as a substantially dry product without an appreciable loss of ammonia; and recycling a major fraction of said withdrawn particles comprising a bulk of small granules to provide feed-supply of di-ammonium phosphate particles to be introduced into the inlet of said reactor-granulator to maintain the said horizontal, rotating, solid bed; said recycled particles being approximately several times the amount of the minor fraction of withdrawn product whereby a finished product of di-ammonium phosphate having a composition of approximately 18–47–0 (N—$P_2O_5$) is produced as a substantially dry product without an appreciable loss of ammonia and as constituted of substantially uniform granules containing product size comprising minus 10 mesh to plus 14 mesh.

References Cited in the file of this patent

UNITED STATES PATENTS

| | | |
|---|---|---|
| 995,898 | Peacock | June 20, 1911 |
| 2,448,126 | Shoeld | Aug. 31, 1948 |
| 2,660,253 | Lutz | June 10, 1952 |
| 2,741,545 | Nielsson | Apr. 10, 1956 |
| 2,792,286 | Wordie et al. | May 14, 1957 |